Oct. 13, 1953    J. CLERC    2,655,260
COMBINED GIFT BOX AND GREETING CARD CARRIER
Filed March 28, 1949    2 Sheets-Sheet 1
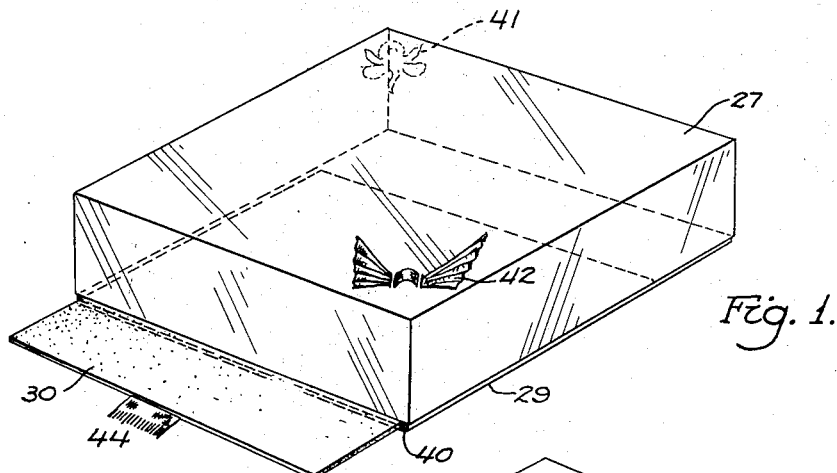
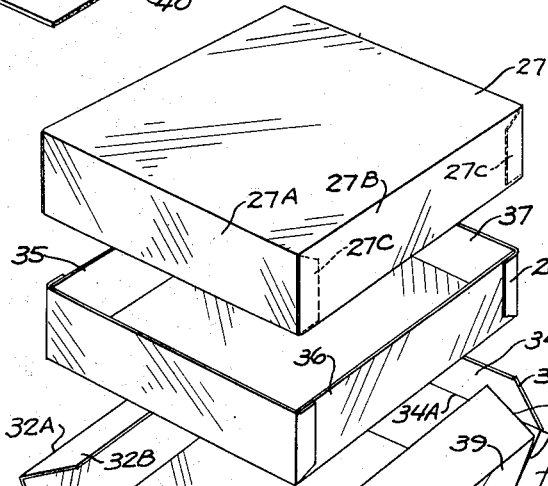
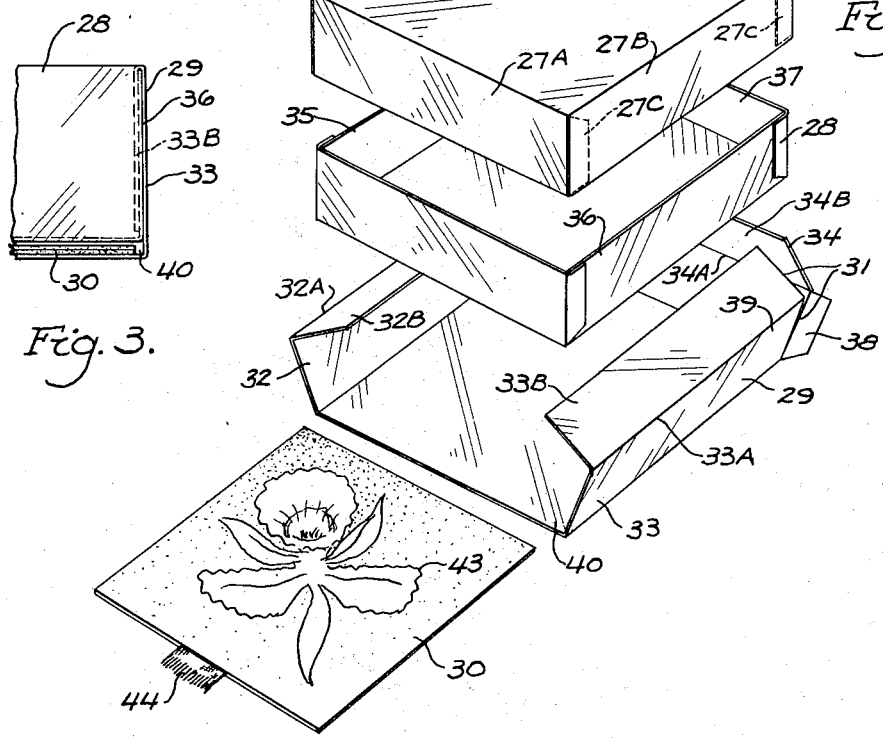
INVENTOR.
Jean Clerc
BY Edward M. Apple
ATTORNEY.

Oct. 13, 1953 J. CLERC 2,655,260
COMBINED GIFT BOX AND GREETING CARD CARRIER
Filed March 28, 1949 2 Sheets-Sheet 2

INVENTOR.
Jean Clerc
BY Edward M. Apple
ATTORNEY.

Patented Oct. 13, 1953

2,655,260

UNITED STATES PATENT OFFICE 2,655,260

COMBINED GIFT BOX AND GREETING CARD CARRIER

Jean Clerc, Detroit, Mich.

Application March 28, 1949, Serial No. 83,796

2 Claims. (Cl. 206—45.34)

This invention relates to packaging and has particular reference to a display package with integrated means for carrying a greeting card.

An object of the invention is to generally improve gift boxes and to provide a gift box which is transparent for display purposes and which is arranged to carry a greeting card which is readily accessible at all times.

An object of the invention is to provide a display gift box which is suitable for carrying candy, flowers, wearing apparel, jewelry, cosmetics or other gift items.

Another object of the invention is the provision of a combination display gift package with a bottom compartment accessible from the end or the side for carrying a greeting card.

Another object of the invention is to provide a transparent gift package with a compartment adapted to carry a greeting card which is accessible at all times without the necessity of disturbing the cover of the package.

Another object of the invention is the provision of a gift box which is constructed and arranged so that the user may send a greeting card with a gift without the necessity of enclosing the greeting card in the gift compartment.

Another object of the invention is the provision of a dual-purpose display and gift box which is constructed of transparent material and formed in such a manner as to provide a separate compartment for a gift item and a second compartment for a readily accessible greeting card.

Another object of the invention is to provide a triple-purpose display, gift and greeting card vehicle which is light in weight, sturdy in construction and economical to manufacture.

Another object of the invention is to provide a transparent gift box which is constructed and arranged to encourage the wide spread use of elaborate greeting cards.

Another object of the invention is to provide a unitary package whereby the customer, in a single purchase, may obtain a gift, package and an appropriate greeting card, thereby conserving the purchaser's shopping time and effecting savings on overhead to the merchant.

The foregoing and other objects and advantages of the invention will become more apparent as the description proceeds, reference being made from time to time to the accompanying drawings forming part of the within disclosure in which drawings:

Fig. 1 is a perspective view of a device embodying the invention.

Fig. 2 is an extended view in perspective of the elements comprising the device, illustrated in Fig. 1.

Fig. 3 is a fragmentary elevational detail of one corner of the box shown in Fig. 1 with the cover removed.

Figure 4:
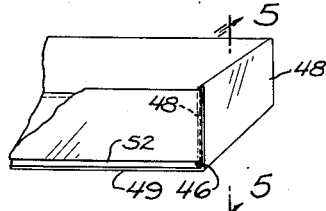
Fig. 4 is a fragmentary detail in elevation of a corner of a modified form of box with the cover removed.

Referring now more particularly to the drawings, it will be understood that in the embodiment herein disclosed (Figs. 1, 2, and 3), reference character 27 indicates the cover, 28 indicates the box proper and 29 indicates the member forming the compartment for the accommodation of the greeting card 30. The elements 27, 28 and 29 are preferably formed of individual sections of transparent material and assembled as hereinafter described.

The top 27 is formed of a sheet of transparent plastic material having its marginal edges bent downwardly to form integral sides 27A and 27B which overlap one another and are cemented together as at 27C. The box 28 is constructed in substantially the same manner as is the cover 27 except that it is inverted and of such size to permit it to telescope the cover 27 when member 29 is assembled thereto.

The member 29 is also formed of a single sheet of transparent plastic material which is cut along the line 31 and along a similar line on the opposite side (not shown) to form side flaps 32 and 33, and end flap 34. The side flaps 32 and 33 and the end flap 34 are bent along a longitudinal median line as at 32A, 33A and 34A, whereby the upper portions 32B, 33B and 34B of the flaps may be extended over and downwardly along the inside of the side walls 35 and 36 and end walls 37 of the box 28. The end flap 34 is provided with a small tab 38 at each end which is bent over the end 39 of the flap 33 and is secured in position by cementing or other suitable means. When the members 28 and 29 are assembled as hereinafter described, a shallow auxiliary compartment 40 will be provided below the box 28 for the accommodation of the greeting card 30 which may be inserted therein and withdrawn therefrom without the necessity of removing the top 27 from the box 28 when the parts are assembled as shown in Fig. 1. Decorative elements 41 and 42 which match the decorative scheme 43 of the card 30, may be positioned on the under surface of the cover 27 to improve the appearance of the package. The card 30 may be a conventional greeting card, appropriate for the occasion, and may be provided with a pull tab 44 whereby the card may readily be removed from the compartment 40.

Figure 5:
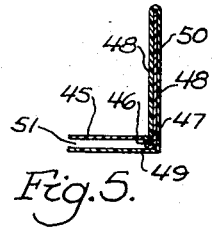
Fig. 5 is a section taken substantially on the line 5—5 of Fig. 4.

In Figs. 4 and 5 I show a modified box structure in which the bottom of the box 45 is provided along each side and at the rear with a groove 46 which is adapted to accommodate the ends 47 of the member 48, which comprises an extension of the false bottom 49 and which extends upwardly along the outside and over the edge of and downwardly along the inside of the vertical wall 50 of the box. This arrangement serves as a novel means for securing the false bottom 49 to the box proper. The space 51 defined between the bottom 45 and the false bottom 49 serves to house the greeting card 52 as previously described.

Figure 6:
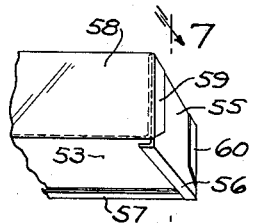
Fig. 6 is a perspective detail of another modified form of box with the cover removed.
Figure 7:
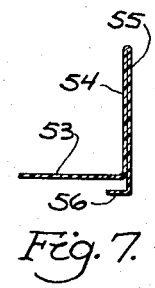
Fig. 7 is a section taken substantially on the line 7—7 of Fig. 6.

In Figs. 6 and 7 I show another modified form of the box structure in which the bottom of the box 53 extends upwardly as at 54 and downwardly as at 55 to define a double vertical side wall for the box, the lower end of the portion 55, being inturned as at 56 to provide retaining means for the greeting card (not shown). The bottom 53 has a rear portion which extends upwardly and returns to form the rear wall of the box, the lower edge of which is inturned as at 57, which cooperates with the member 56 to support the greeting card. The front wall 58 and the rear wall (not shown) are provided with tabs 59 and 60, respectively, which may be bent around the ends of the side wall 55 where they are secured by cement or other suitable means.

Figure 8:
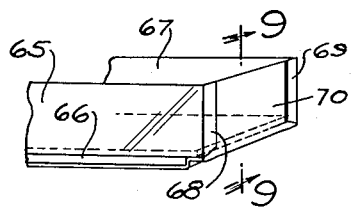
Fig. 8 is a perspective detail of a still further modified form of box with the cover removed.
Figure 9:
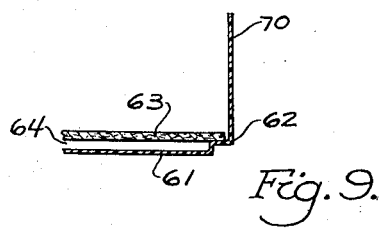
Fig. 9 is a section taken substantially on the line 9—9 of Fig. 8.

In Figs. 8 and 9 I show a still further modified form of box and auxiliary compartment construction. In this embodiment the bottom 61 has a shoulder 62 formed along opposite sides and along the rear which is adapted to accommodate a sheet of cardboard or other suitable material 63 which serves as a false bottom for the box and defines between it and the bottom 61 a space 64 for the accommodation of the greeting card. The front wall 65 (Fig. 8) of the box is provided with a transverse slot 66 which permits a greeting card (not shown) to be slid into the space 64. The corner of the front wall 65 and rear wall 67 are provided with ears 68 and 69 which are folded over the side wall 70 and are secured by cement or other suitable means.

Figure 10:
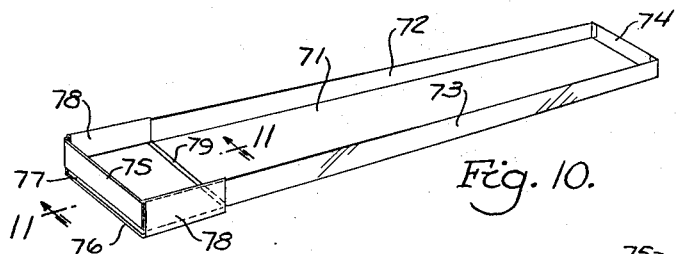
Fig. 10 is a perspective view of a still further modified form of box with the cover removed.
Figure 11:
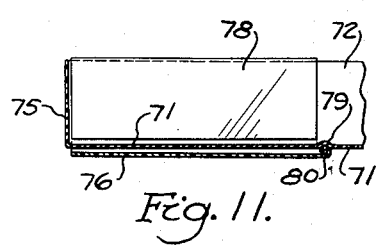
Fig. 11 is a section taken substantially on the line 11—11 of Fig. 10.

In Figs. 10 and 11 I illustrate a further modified form of box which is elongated to accommodate a necktie, gloves or the like. This box is formed in conventional manner with bottom 71, side walls 72 and 73 and end walls 74 and 75. At one end, however, of this box, I provide a false bottom 76 which defines between it and the bottom 71, a space 77 for the accommodation of the greeting card. In this embodiment the false bottom 76 has extension members 78 which extend upwardly and over and downwardly along the side walls 72 and 73. In this embodiment, the bottom 71 of the box has a transverse groove 79 formed therein which is adapted to accommodate a rolled edge 80 formed at the rear of the false bottom member 76 which prevents the displacement of the elements.

Figure 12:
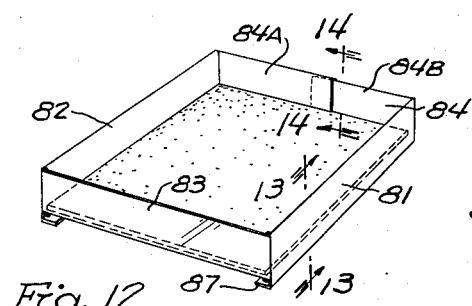
Fig. 12 is a perspective view of a still further modified form of box with the cover removed.
Figures 13, 14:
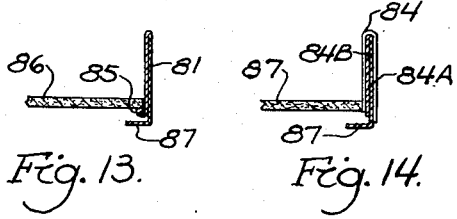
Fig. 13 is a section taken substantially on the line 13—13 of Fig. 12.
Fig. 14 is a section taken substantially on the line 14—14 of Fig. 12.

In Figs. 12, 13 and 14 I show a further modified form of box construction embodying the invention in which the side walls 81 and 82 and end walls 83 and 84 are formed of a continuous length of material which is folded upon itself, as shown in Fig. 13 to form walls of double thickness. One edge of the material comprising the side walls is rolled as at 85 to provide a support for the bottom 86 of the box. The other edge 87 is inturned to provide a shoulder adapted to support the greeting card (not shown). Fig. 14 illustrates the manner in which the ends 84A and 84B of the end wall 84 telescope each other in the formation of the walls. The ends 84A and 84B may be cemented or secured together by any other suitable means.

Figure 15:
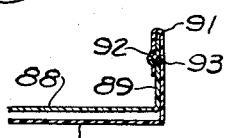
Fig. 15 is an enlarged fragmentary sectional view of a further modified form of box construction.

In Fig. 15 I show a further modified form of box construction in which the bottom member 88 extends upwardly to form one thickness of the side wall 89. In this embodiment the false bottom 90 has an upwardly extending member 91 which extends over the edge of the side wall 89 and downwardly along the same. The members 89 and 91 are provided with cooperating grooves 92 and beads 93 which have locking means to prevent the displacement of the elements.

Also, I have herein disclosed certain embodiments of the invention. It will be understood that other forms of construction may be employed, all of which in contemplation of the invention and intended to be within the scope of the appendant claims. Having described my invention what I claim and desire to secure by Letters Patent is:

1. A combined gift box and greeting card carrier comprising two sheets of transparent plastic material, positioned one above the other, the lower of said sheets being cut and folded to form a false bottom and double side walls, the other said sheet being folded to form a bottom, side walls and end walls, each double side wall of the first sheet being positioned with a single thickness on either side of one of the side walls of said second sheet, a transverse groove formed on the bottom portion of said second sheet cooperating with a mating element formed on the bottom portion of said other sheet, whereby to prevent the longitudinal movement of said sheets, the bottom portions of said sheets being spaced from one another to define an area for receiving a greeting card, said greeting card receiving area being accessible from one end of said box.

2. The structure defined in claim 1, in which the said groove on the bottom of said second sheet is parallel with at least one end wall of said box.

JEAN CLERC.

References Cited in the file of this patent

UNITED STATES PATENTS

| Number | Name | Date |
|---|---|---|
| 1,544,463 | Lengsfield | June 30, 1925 |
| 1,568,982 | Lengsfield | Jan. 12, 1926 |
| 1,994,063 | Bruns et al. | Mar. 12, 1935 |
| 2,129,447 | Schuler | Sept. 6, 1938 |
| 2,317,884 | Clouston | Apr. 27, 1943 |
| 2,334,546 | Davis | Nov. 16, 1943 |
| 2,453,920 | Kysela | Nov. 16, 1948 |
| 2,544,101 | Oxley | Mar. 6, 1951 |